United States Patent
Tanaka

(10) Patent No.: US 9,528,437 B2
(45) Date of Patent: Dec. 27, 2016

(54) INTERNAL COMBUSTION ENGINE COMPRISING VARIABLE COMPRESSION RATIO MECHANISM

(75) Inventor: Hiroyuki Tanaka, Suntou-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 34 days.

(21) Appl. No.: 14/403,676

(22) PCT Filed: May 31, 2012

(86) PCT No.: PCT/JP2012/064201
§ 371 (c)(1),
(2), (4) Date: Nov. 25, 2014

(87) PCT Pub. No.: WO2013/179465
PCT Pub. Date: May 12, 2013

(65) Prior Publication Data
US 2015/0136089 A1 May 21, 2015

(51) Int. Cl.
| | | |
|---|---|---|
| *F02B 75/04* | (2006.01) | |
| *F02D 23/00* | (2006.01) | |
| *F02D 41/14* | (2006.01) | |
| *F02D 13/02* | (2006.01) | |
| *F02D 15/04* | (2006.01) | |
| *F02D 41/00* | (2006.01) | |

(Continued)

(52) U.S. Cl.
CPC ........... *F02B 75/04* (2013.01); *F02D 13/0276* (2013.01); *F02D 23/005* (2013.01); *F02D 41/1446* (2013.01); *F02D 41/1448* (2013.01); *F01L 1/3442* (2013.01); *F01L 2800/00* (2013.01); *F02B 37/18* (2013.01); *F02D 15/04* (2013.01); *F02D 41/0007* (2013.01); *F02D 2041/001* (2013.01); *F02D 2200/0406* (2013.01); *Y02T 10/18* (2013.01)

(58) Field of Classification Search
CPC ...... F02D 15/00; F02D 15/04; F02D 13/0276; F02D 23/005; F02D 41/1446; F02D 41/1448; F02D 41/0007; F02D 2041/001; F02D 2200/0406; F01L 1/3442; F01L 2800/00; F01L 2800/14; F02B 75/04; F02B 37/18; F02B 75/041; Y02T 10/18
USPC .................... 123/48 C, 48 R, 559.1; 701/103
See application file for complete search history.

(56) References Cited

U.S. PATENT DOCUMENTS

| | | | | |
|---|---|---|---|---|
| 4,856,463 A | * | 8/1989 | Johnston ................... | F01B 7/14 123/41.73 |
| 5,058,536 A | * | 10/1991 | Johnston ................... | F01B 7/14 123/51 BA |

(Continued)

FOREIGN PATENT DOCUMENTS

| | | |
|---|---|---|
| DE | 102010032487 A1 | 2/2012 |
| JP | 2006-046193 A | 2/2006 |

(Continued)

*Primary Examiner* — Grant Moubry
(74) *Attorney, Agent, or Firm* — Andrews Kurth Kenyon LLP

(57) ABSTRACT

This internal combustion engine comprising a variable compression ratio mechanism either measures an exhaust temperature or exhaust pressure which varies according to an actual expansion ratio, or measures a physical quantity which varies according to the exhaust temperature and/or the exhaust pressure, and estimates the current mechanical compression ratio on the basis of the measured value.

7 Claims, 14 Drawing Sheets

(51) Int. Cl.
*F02B 37/18* (2006.01)
*F01L 1/344* (2006.01)

(56) References Cited

U.S. PATENT DOCUMENTS

| | | | |
|---|---|---|---|
| 6,167,851 B1 * | 1/2001 | Bowling | F02B 75/048 |
| | | | 123/48 B |
| 6,273,076 B1 * | 8/2001 | Beck | F02B 29/0418 |
| | | | 123/562 |
| 7,213,543 B2 * | 5/2007 | Miyashita | F02D 15/00 |
| | | | 123/48 C |
| 2009/0276140 A1 | 11/2009 | Akihisa et al. | |
| 2010/0017098 A1 | 1/2010 | Fukuchi et al. | |
| 2010/0206271 A1 | 8/2010 | Akihisa et al. | |
| 2011/0307159 A1 | 12/2011 | Nakasaka | |
| 2012/0031377 A1 | 2/2012 | Okada et al. | |

FOREIGN PATENT DOCUMENTS

| | | |
|---|---|---|
| JP | 2010-024859 A | 2/2010 |
| JP | 2010-024977 A | 2/2010 |
| JP | 2010-025010 A | 2/2010 |
| JP | 2010-174757 A | 8/2010 |
| WO | 2009/022751 A1 | 2/2009 |
| WO | 2010/073411 A1 | 7/2010 |
| WO | 2010/125694 A1 | 11/2010 |

* cited by examiner

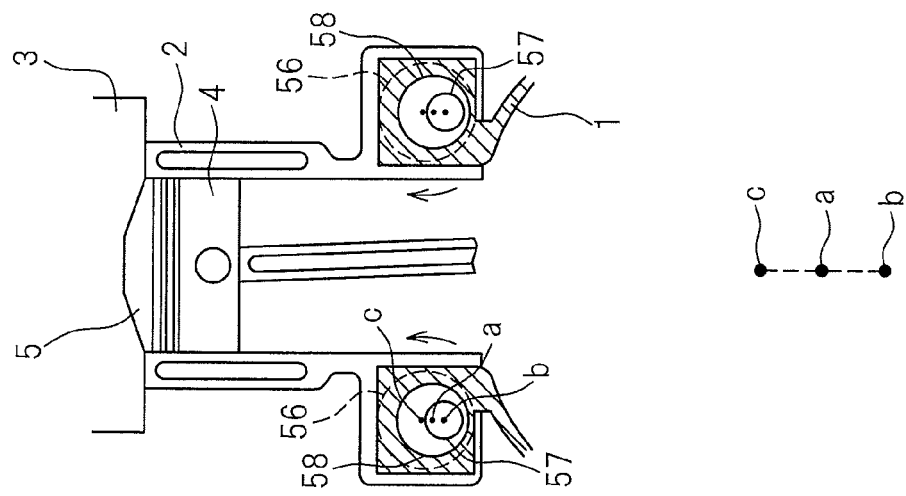
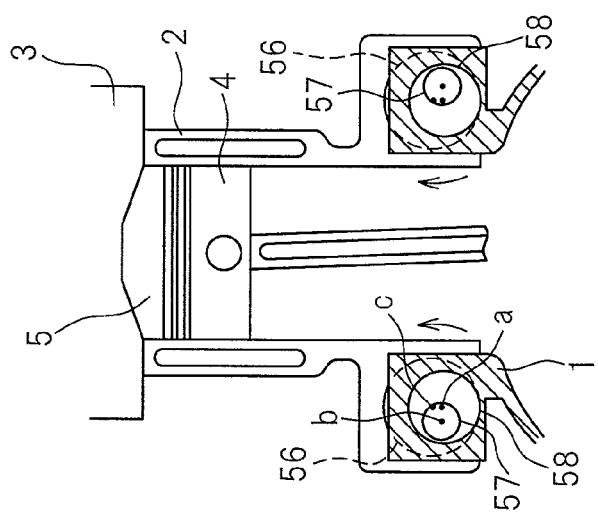
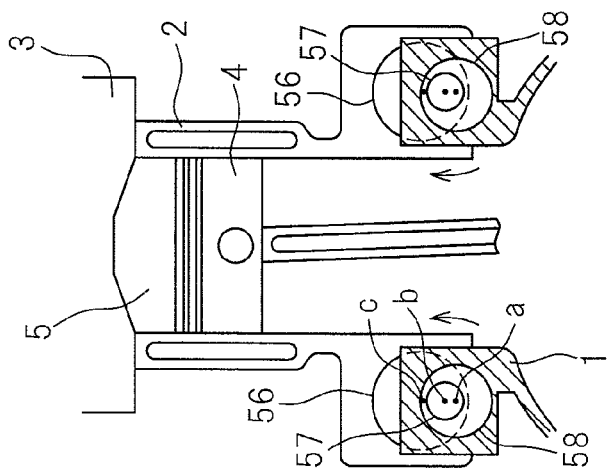

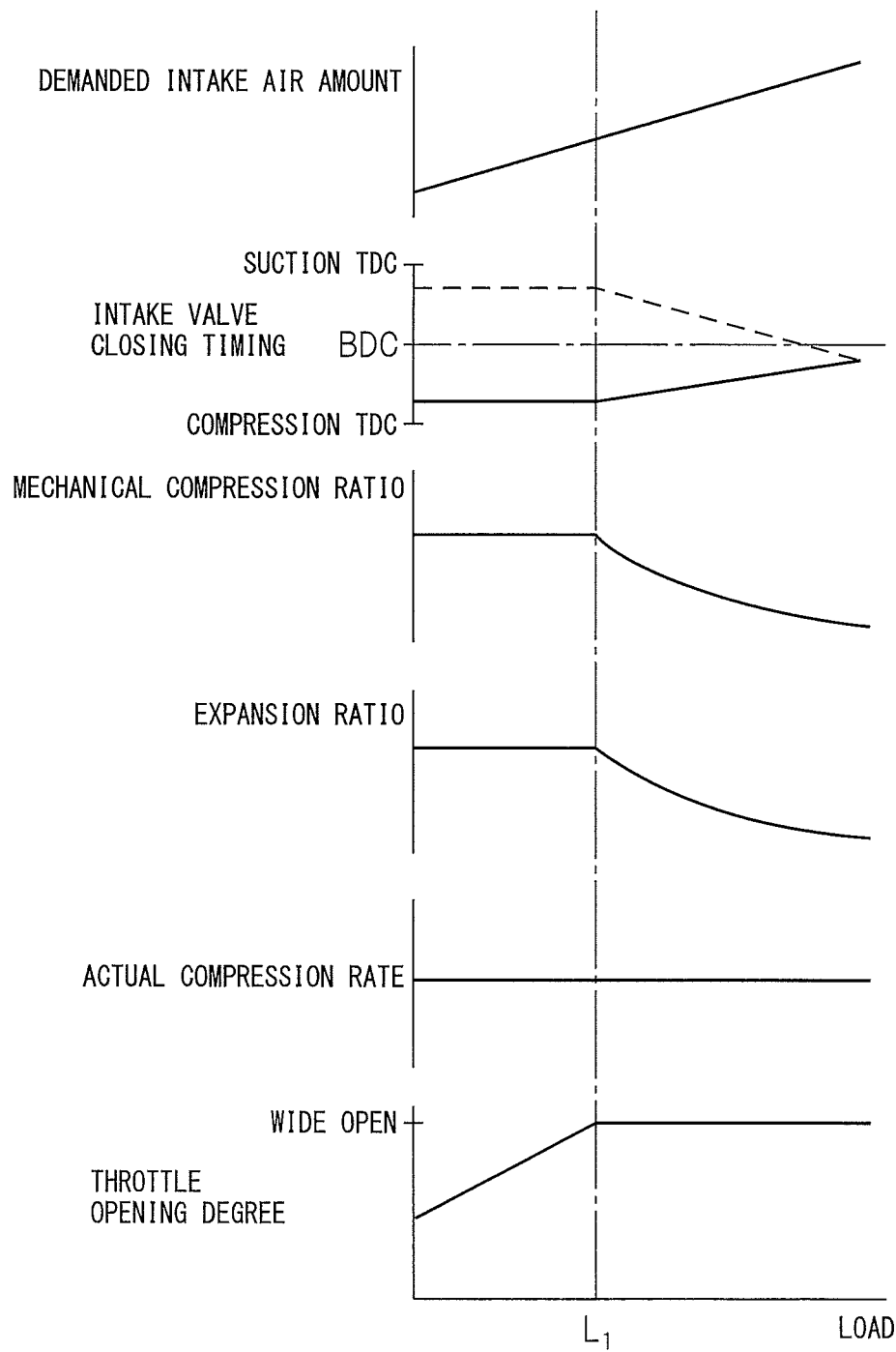

INTERNAL COMBUSTION ENGINE COMPRISING VARIABLE COMPRESSION RATIO MECHANISM

CROSS-REFERENCE TO RELATED APPLICATION

This is a national phase application based on the PCT International Patent Application No. PCT/JP2012/064201 filed May 31, 2012, the entire contents of which are incorporated herein by reference.

TECHNICAL FIELD

The present invention relates to an internal combustion engine which is provided with a variable compression ratio mechanism.

BACKGROUND ART

Known in the art is an internal combustion engine which is provided with a variable compression ratio mechanism which can make a cylinder block move along a cylinder axis with respect to a crankcase so as to change the mechanical compression ratio. In general, the lower the engine load, the lower the thermal efficiency, so in such an internal combustion engine which is provided with a variable compression ratio mechanism, the mechanical compression ratio is made higher the lower the engine load so as to raise the expansion ratio and raise the thermal efficiency.

In this way, in an internal combustion engine which is provided with a variable compression ratio mechanism, target mechanical compression ratios are respectively set for the current engine operating states and the variable compression ratio mechanism is controlled so that the current target mechanical compression ratios are realized. However, in actuality, sometimes the current target mechanical compression ratio is not realized. If the target mechanical compression ratio is not realized, the current desired expansion ratio is also not realized.

In this way, it is desirable to estimate the current actual mechanical compression ratio. For example, the cylinder pressure at the time of combustion is affected by the amount of fed fuel, so it has been proposed to use the cylinder pressure at top dead center during a fuel cut operation as the basis to estimate the current actual compression ratio (see PLT 1).

CITATIONS LIST

Patent Literature

PLT 1: Japanese Patent Publication No. 2010-174757A
PLT 2: Japanese Patent Publication No. 2006-046193A
PLT 3: International Publication WO2010/073411
PLT 4: International Publication WO2010/125694
PLT 5: Japanese Patent Publication No. 2010-024977A

SUMMARY OF INVENTION

Technical Problem

If the current actual compression ratio is estimated in the above way, the intake valve closing timing can be used as the basis to estimate the current actual mechanical compression ratio. However, unless a fuel cut operation is performed during operation at the current mechanical compression ratio, it is not possible to estimate the current actual compression ratio and due to this it is not possible to estimate the current actual mechanical compression ratio.

Therefore, an object of the present invention is to provide an internal combustion engine which is provided with a variable compression ratio mechanism which can estimate the current actual mechanical compression ratio when a fuel cut operation is not performed.

Solution to Problem

An internal combustion engine which is provided with a variable compression ratio mechanism according to claim 1 of the present invention measures an exhaust temperature or an exhaust pressure which changes in accordance with an actual expansion ratio or measures a physical quantity which changes in accordance with at least one of the exhaust temperature and the exhaust pressure, uses the measured measurement value as the basis to estimate a current mechanical compression ratio, and the measurement value is a supercharging pressure at a downstream side of a compressor of a turbocharger.

An internal combustion engine which is provided with a variable compression ratio mechanism according to claim 3 of the present invention provides the internal combustion engine which is provided with a variable compression ratio mechanism according to claim 1 wherein the engine is provided with a detection device which directly or indirectly detects an actuating amount of an actuator of the variable compression ratio mechanism, the actuator is controlled so that the actuating amount which is detected by the detection device becomes the actuating amount which corresponds to a target mechanical compression ratio, and the actuating amount which is detected by the detecting device is corrected by a difference between the actuating amount which corresponds to a mechanical compression ratio which is estimated based on the measurement value in a specific engine operating state and the actuating amount which corresponds to a target mechanical compression ratio of the specific engine operating state.

An internal combustion engine which is provided with a variable compression ratio mechanism according to claim 4 of the present invention provides the internal combustion engine which is provided with a variable compression ratio mechanism according to claim 3 wherein the specific engine operating state is an engine operating state in which the target mechanical compression ratio becomes a set mechanical compression ratio or less.

An internal combustion engine which is provided with a variable compression ratio mechanism according to claim 5 of the present invention provides the internal combustion engine which is provided with a variable compression ratio mechanism according to claim 1 wherein a wastegate passage which bypasses a turbine of a turbocharger is provided, a wastegate valve which controls an amount of exhaust which passes through the wastegate passage is arranged in the wastegate passage, and a difference between a supercharging pressure at a downstream side of a compressor of the turbocharger which is measured when making the wastegate valve a first opening degree and the supercharging pressure of a compressor of the turbocharger which is measured when making the wastegate valve a second opening degree is made the measurement value.

An internal combustion engine which is provided with a variable compression ratio mechanism according to claim 6 of the present invention provides the internal combustion engine which is provided with a variable compression ratio mechanism according to claim 1 or 5 wherein when a compressor of a supercharger is arranged at an upstream side of the compressor of the turbocharger, the supercharging pressure is made a differential pressure before and after the compressor of the turbocharger.

An internal combustion engine which is provided with a variable compression ratio mechanism according to claim 7 of the present invention provides the internal combustion engine which is provided with a variable compression ratio mechanism according to any one of claims 1 and 3 to 6 wherein the engine estimates the current actual compression ratio and uses the estimated current actual compression ratio and the estimated current mechanical compression ratio as the basis to estimate the current closing timing of the intake valve.

Advantageous Effects of Invention

According to the internal combustion engine which is provided with a variable compression ratio mechanism according to claim 1 of the present invention, the engine measures an exhaust temperature or an exhaust pressure which changes in accordance with an actual expansion ratio or measures a physical quantity which changes in accordance with at least one of the exhaust temperature and the exhaust pressure and uses the measured measurement value as the basis to estimate a current mechanical compression ratio. Due to this, it is possible to estimate the current actual mechanical compression ratio when a fuel cut operation is not being performed.

According to the internal combustion engine which is provided with a variable compression ratio mechanism according to claim 1 of the present invention, in the internal combustion engine which is provided with a variable compression ratio mechanism according to claim 1, the measurement value is a supercharging pressure at a downstream side of a compressor of a turbocharger. A generally provided supercharging pressure sensor can be used to measure the measurement value for estimating the mechanical compression ratio.

According to the internal combustion engine which is provided with a variable compression ratio mechanism according to claim 3 of the present invention, in the internal combustion engine which is provided with a variable compression ratio mechanism according to claim 1, the engine is provided with a detection device which directly or indirectly detects an actuating amount of an actuator of the variable compression ratio mechanism, the actuator is controlled so that the actuating amount which is detected by the detection device becomes the actuating amount which corresponds to a target mechanical compression ratio, and the actuating amount which is detected by the detecting device is corrected by a difference between the actuating amount which corresponds to a mechanical compression ratio which is estimated based on the measurement value in a specific engine operating state and the actuating amount which corresponds to a target mechanical compression ratio of the specific engine operating state. Due to this, by such control of the actuator based on the corrected actuating amount, it is possible to realize the target mechanical compression ratio even in an engine operation other than a specific engine operating state.

According to the internal combustion engine which is provided with a variable compression ratio mechanism according to claim 4 of the present invention, in the internal combustion engine which is provided with a variable compression ratio mechanism according to claim 3, the specific engine operating state is an engine operating state in which the target mechanical compression ratio becomes a set mechanical compression ratio or less. The exhaust temperature or exhaust pressure changes relatively largely in response to a slight deviation in the mechanical compression ratio when the target mechanical compression ratio is not realized, so a slight deviation of the mechanical compression ratio can be accurately detected and the actuating amount of which detected by the detection device can be accurately corrected.

According to the internal combustion engine which is provided with a variable compression ratio mechanism according to claim 5 of the present invention, in the internal combustion engine which is provided with a variable compression ratio mechanism according to claim 1, a wastegate passage which bypasses a turbine of a turbocharger is provided, a wastegate valve which controls an amount of exhaust which passes through the wastegate passage is arranged in the wastegate passage, and a difference between a supercharging pressure at a downstream side of a compressor of the turbocharger which is measured when making the wastegate valve a first opening degree and the supercharging pressure at a downstream side of a compressor of the turbocharger which is measured when making the wastegate valve a second opening degree is made the measurement value. Due to this, it is possible to eliminate the deviation, from the measurement value, in the supercharging pressure which occurs due to individual differences in turbochargers and possible to estimate a more accurate mechanical compression ratio.

According to the internal combustion engine which is provided with a variable compression ratio mechanism according to claim 6 of the present invention, in the internal combustion engine which is provided with a variable compression ratio mechanism according to claim 1 or 5, when a compressor of a supercharger is arranged at an upstream side of the compressor of the turbocharger, the supercharging pressure is made a differential pressure before and after the compressor of the turbocharger. Due to this, it is possible to eliminate the effect of supercharging by the compressor of the supercharger and possible to estimate a more accurate mechanical compression ratio.

According to the internal combustion engine which is provided with a variable compression ratio mechanism according to claim 7 of the present invention, in the internal combustion engine which is provided with a variable compression ratio mechanism according to any of claims 1 and 3 to 6, the engine estimates the current actual compression ratio and uses the estimated current actual compression ratio and the estimated current mechanical compression ratio as the basis to estimate the current closing timing of the intake valve. It becomes possible to estimate an accurate closing timing of the intake valve.

BRIEF DESCRIPTION OF DRAWINGS

FIGS. 3(A) to 3(C) are side cross-sectional views of an internal combustion engine which is shown schematically.

FIG. 9 is a view which shows changes in a mechanical compression ratio etc. in accordance with an engine load.

DESCRIPTION OF EMBODIMENTS

Figure 1:
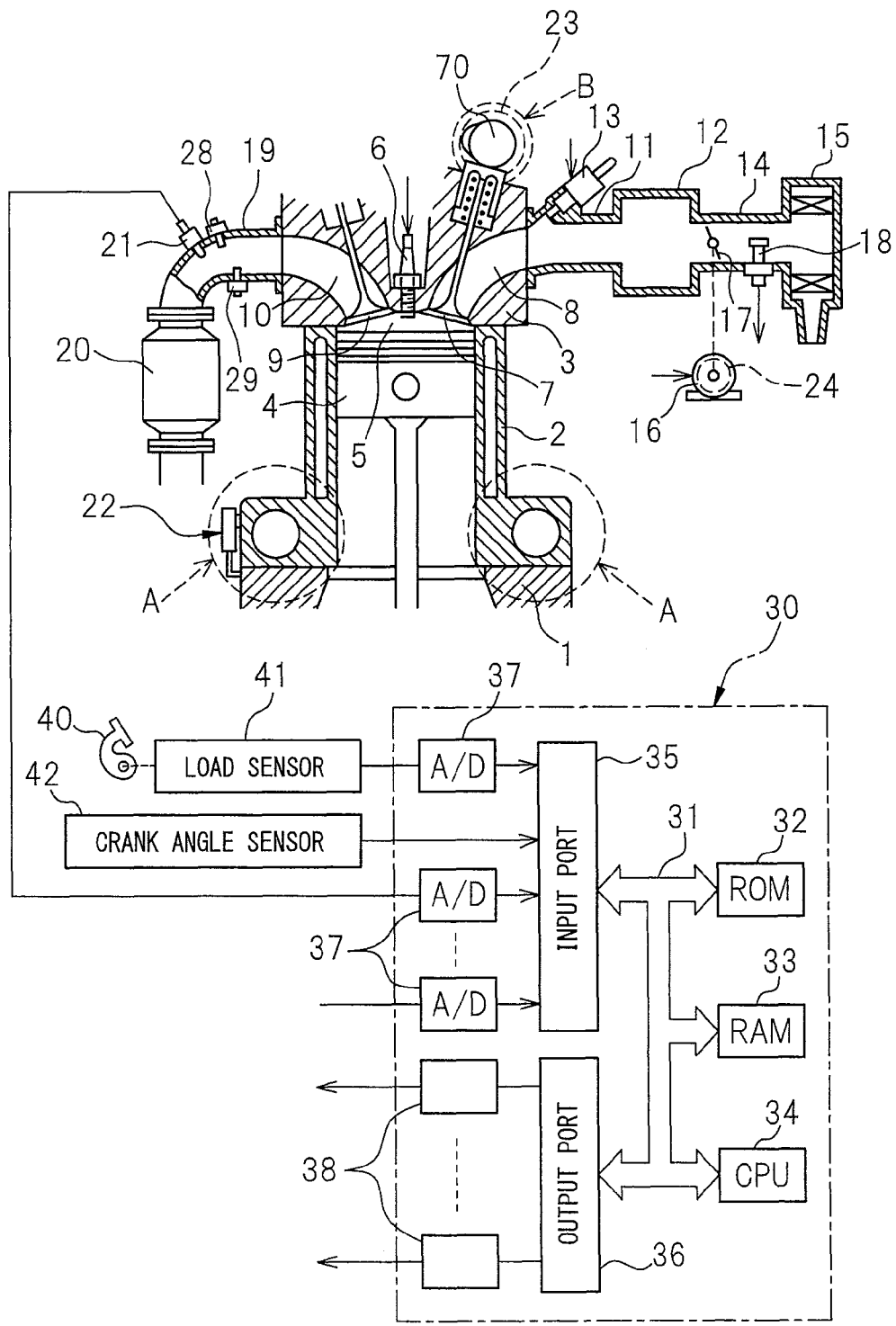
FIG. 1 is an overview of an internal combustion engine.

FIG. 1 shows a side cross-sectional view of an internal combustion engine which is provided with a variable compression ratio mechanism according to the present invention. Referring to FIG. 1, 1 indicates a crankcase, 2 a cylinder block, 3 a cylinder head, 4 a piston, 5 a combustion chamber, 6 a spark plug which is arranged at the top center of a combustion chamber 5, 7 an intake valve, 8 an intake port, 9 an exhaust valve, and 10 an exhaust port. Each intake port 8 is connected through an intake runner 11 to a surge tank 12. At each intake runner 11, a fuel injector 13 is arranged for injecting fuel toward the inside of the respectively corresponding intake port 8. Note that, each fuel injector 13 may be arranged in a combustion chamber 5 instead of attached to an intake runner 11.

The surge tank 12 is connected with an air cleaner 15 through an intake duct 14. Inside the intake duct 14, a throttle valve 17 which is driven by an actuator 16 and an intake air detector 18 which uses for example hot wires are arranged. The exhaust port 10 is connected through an exhaust manifold 19 to a catalyst device 20 which has for example a three-way catalyst built into it. Inside the exhaust manifold 19, an air-fuel ratio sensor 21 is arranged. Further, inside the exhaust manifold 19, a temperature sensor 28 for measuring the exhaust temperature and a pressure sensor 29 for measuring the exhaust pressure are arranged.

On the other hand, in the embodiment which is shown in FIG. 1, at the connecting part of the crankcase 1 and the cylinder block 2, a variable compression ratio mechanism A is provided which can change the relative positions of the crankcase 1 and the cylinder block 2 in the cylinder axial direction and thereby change the volume of the combustion chamber 5 when the piston 4 is positioned at compression top dead center. Furthermore, an actual compression action start timing changing mechanism B which is able to change the start timing of the actual compression action is provided. Note that, in the embodiment which is shown in FIG. 1, this actual compression action start timing changing mechanism B is comprised of a variable valve timing mechanism which can control the closing timing of the intake valve 7.

As shown in FIG. 1, the crankcase 1 and the cylinder block 2 have a relative position sensor 22 attached to them for detecting the relative positional relationship between the crankcase 1 and the cylinder block 2. From this relative position sensor 22, an output signal which shows the change in distance between the crankcase 1 and the cylinder block 2 is output. Further, the variable valve timing mechanism B has a valve timing sensor 23 which generates an output signal which shows a closing timing of the intake valve 7 attached to it. The actuator 16 for driving the throttle valve has a throttle opening degree sensor 24 which generates an output signal which shows the throttle valve opening degree attached to it.

An electronic control unit 30 is comprised of a digital computer. This is provided with components connected to each other through a bidirectional bus 31 such as a ROM (read only memory) 32, RAM (random access memory) 33, CPU (microprocessor) 34, input port 35, and output port 36. Output signals of the intake air detector 18, the air-fuel ratio sensor 21, relative position sensor 22, valve timing sensor 23, throttle opening degree sensor 24, later explained cam rotational angle sensor 25, temperature sensor 28, and pressure sensor 29 are input through respectively corresponding AD converters 37 to an input port 35. Further, the accelerator pedal 40 is connected to a load sensor 41 which generates an output voltage which is proportional to the amount of depression L of the accelerator pedal 40. The output voltage of the load sensor 41 is input through a corresponding AD converter 37 to the input port 35. Furthermore, the input port 35 is connected to a crank angle sensor 42 which generates an output pulse each time a crankshaft rotates by for example 30°. On the other hand, the output port 36 is connected through a corresponding drive circuit 38 to each spark plug 6, fuel injector 13, throttle valve drive-use actuator 16, variable compression ratio mechanism A, and variable valve timing mechanism B.

Figure 2:
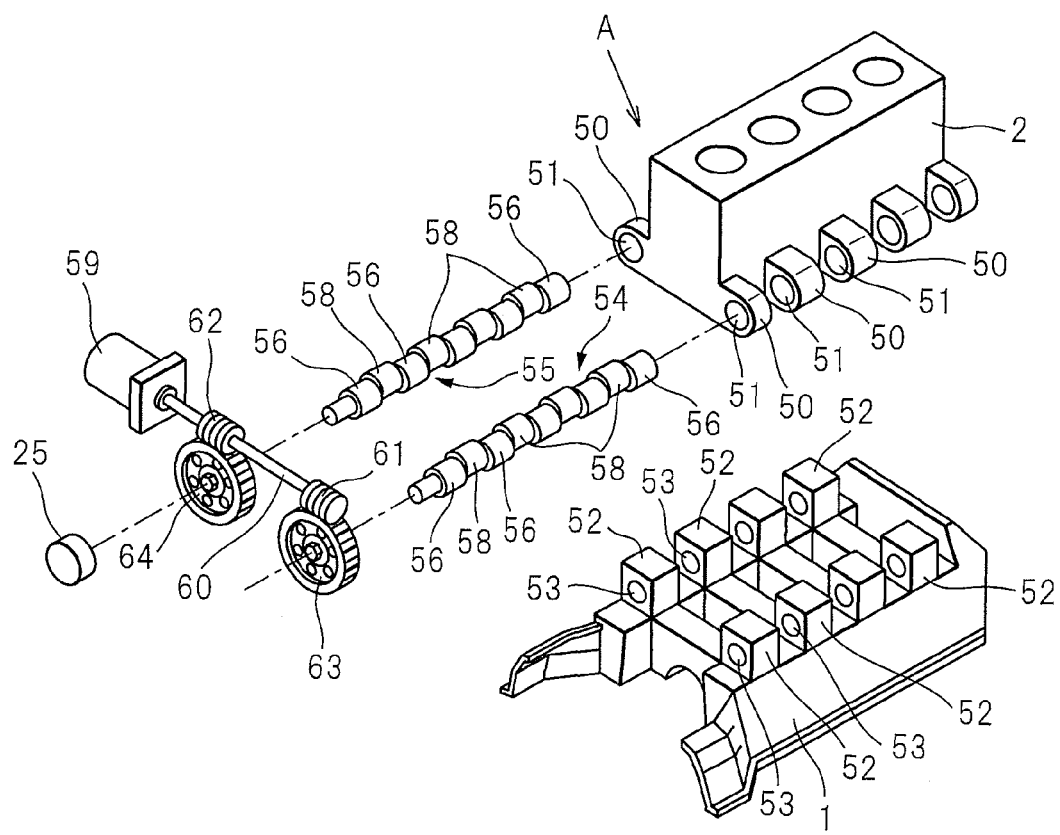
FIG. 2 is a disassembled perspective view of a variable compression ratio mechanism.

FIG. 2 is a disassembled perspective view of the variable compression ratio mechanism A which is shown in FIG. 1, while FIGS. 3(A) to 3(C) are side cross-sectional views of the illustrated internal combustion engine. Referring to FIG. 2, at the bottom of the two sides of the cylinder block 2, a plurality of projecting parts 50 are formed spaced apart from each other. That is, cylinder block side supports are formed. Inside these projecting parts 50, cam insertion holes 51 of round cross-sectional shapes are formed. On the other hand, at the top surface of the crankcase 1, a plurality of projecting parts 52 are formed which are spaced apart from each other and fit between the corresponding projecting parts 50. That is, crankcase side supports are formed. Inside these projecting parts 52 as well, round cross-section cam insertion holes 53 are formed.

As shown in FIG. 2, a pair of cam shafts 54 and 55 are provided. On these cam shafts 54 and 55, at every other position, a concentric part 58 which is inserted rotably into a cam insertion hole 53 is positioned. These concentric parts 58 are coaxial with the axes of rotation of the cam shafts 54, 55. On the other hand, at the two sides of each concentric part 58, as shown in FIGS. 3(A) to 3(C), eccentric parts 57 which are arranged eccentrically with respect to the axes of rotation of the cam shafts 54, 55 are positioned. Other circular cams 56 are attached eccentrically on these eccentric parts 57 in a rotatable manner. That is, the eccentric parts 57 engage with the eccentric holes which are formed in the circular cams 56 and the circular cams 56 pivot about the eccentric parts 57 centered about the eccentric holes. As shown in FIG. 2, these circular cams 56 are arranged at the two sides of each concentric part 58. These circular cams 56 are rotatably inserted into the corresponding cam insertion holes 51. Further, as shown in FIG. 2, the cam shaft 55 has a cam rotational angle sensor 25 which generates an output signal which expresses the rotational angle of the cam shaft 55 attached to it.

If making the concentric parts 58 of the cam shafts 54 and 55 rotate from the state such as shown in FIG. 3(A) in the mutually opposite directions as shown by the solid arrows in FIG. 3(A), the eccentric parts 57 move in directions away from each other, so the circular cams 56 rotate in opposite directions from the concentric parts 58 in the cam insertion holes 51 and, as shown in FIG. 3(B), the positions of the eccentric parts 57 change from high positions to intermediate height positions. If next making the concentric parts 58 further rotate in the direction shown by the arrow, as shown by FIG. 3(C), the eccentric parts 57 become the lowest position.

Note that, FIG. 3(A), FIG. 3(B), and FIG. 3(C) show the positional relations between the center "a" of the concentric part 58 and the center "b" of the eccentric part 57 at their respective states.

As will be understood from a comparison of FIG. 3(A) to FIG. 3(C), the relative positions of the crankcase 1 and the cylinder block 2 are determined by the distance between the center "a" of the concentric part 58 and the center "c" of the circular cam 56. The larger the distance between the center "a" of the concentric part 58 and the center "c" of the circular cam 56 is made, the further the cylinder block 2 is away from the crankcase 1. That is, the variable compression ratio mechanism A uses a crank mechanism using a rotating cam so as to make the relative positions between the crankcase 1 and cylinder block 2 change. If the cylinder block 2 moves away from the crankcase 1, the volume of the combustion chamber 5 when the piston 4 is positioned at compression top dead center increases. Therefore, by rotating the cam shafts 54 and 55, the volume of the combustion chamber 5 when the piston 4 is positioned at compression top dead center can be changed.

As shown in FIG. 2, to make the cam shafts 54 and 55 rotate in opposite directions, the shaft of a drive motor 59 is formed with a pair of worms 61 and 62 with opposite spiral directions. The worm gears 63 and 64 which engage with these worms 61 and 62 are fastened to the ends of the cam shafts 54 and 55. In this embodiment, by operating the drive motor 59, the volume of the combustion chamber 5 when the piston 4 is positioned at compression top dead center can be changed over a wide range.

Figure 4:
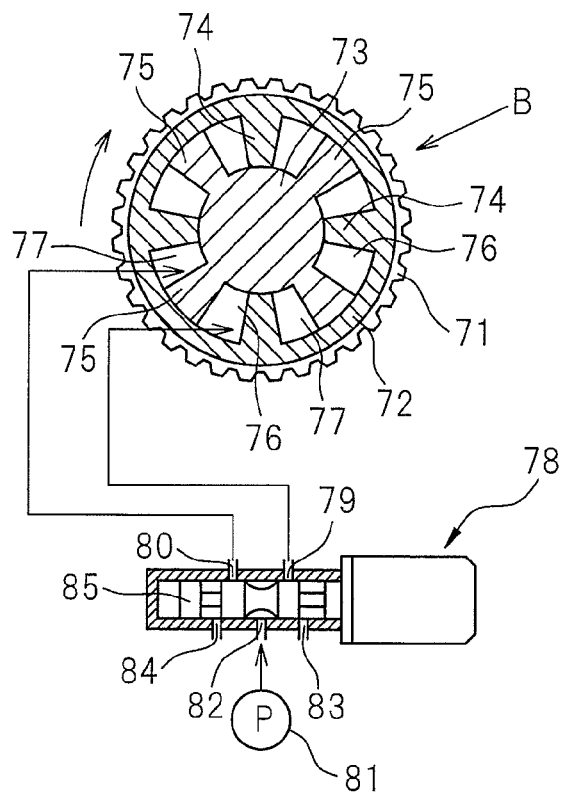
FIG. 4 is a view which shows a variable valve timing mechanism.

On the other hand, FIG. 4 shows a variable valve timing mechanism B which is attached to the end part of the cam shaft 70 for driving the intake valve 7 at FIG. 1. If referring to FIG. 4, this variable valve timing mechanism B is provided with a timing pulley 71 which is made to rotate in the arrow direction by the engine crankshaft through the timing belt, a cylindrical housing 72 which rotates together with the timing pulley 71, a rotary shaft 73 which can rotate together with the intake valve drive-use cam shaft 70 and which can rotate with respect to the cylindrical housing 72, a plurality of partition walls 74 which extend from the inside circumferential wall of the cylindrical housing 72 to the outside wall circumference of the rotary shaft 73, and vanes 75 which extend from the outside circumferential surface of the rotary shaft 73 to the inside circumferential surface of the cylindrical housing 72 between the partition walls 74. At the two sides of each vane 75, an advance-use hydraulic chamber 76 and a delay-use hydraulic chamber 77 are formed.

The feed of working oil to the hydraulic chambers 76 and 77 is controlled by a working oil feed control valve 78. This working oil feed control valve 78 is provided with hydraulic ports 79 and 80 which are respectively connected to the hydraulic chambers 76 and 77, a feed port 82 of working oil which is discharged from the hydraulic pump 81, a pair of drain ports 83 and 84, and a spool valve 85 which controls the connections and disconnections of the ports 79, 80, 82, 83, and 84.

When advancing the phase of the cam of the intake valve drive-use cam shaft 70, the spool valve 85 is made to move to the right in FIG. 4, working oil which is supplied from the feed port 82 is supplied to the advance-use hydraulic chamber 76 through a hydraulic port 79, and working oil in the delay-use hydraulic chamber 76 is exhausted from the drain port 84. At this time, the rotary shaft 73 is made to rotate relative to the cylindrical housing 72 in the arrow direction.

As opposed to this, when delaying the phase of the cam of the intake valve drive-use cam shaft 70, the spool valve 85 is made to move to the left in FIG. 4, working oil which is supplied from the feed port 82 is supplied to the delay-use hydraulic chamber 77 through the hydraulic port 80, and working oil in the advance-use hydraulic chamber 76 is exhausted from the drain port 83. At this time, the rotary shaft 73 is made to rotate relative to the cylindrical housing 72 in the opposite direction to the arrow mark.

When the rotary shaft 73 is made to rotate relative to the cylindrical housing 72, if the spool valve 85 is returned to the neutral position which is shown in FIG. 4, the relative rotation operation of the rotary shaft 73 is made to stop and the rotary shaft 73 is held at the relative rotation position at that time. Therefore, the variable valve timing mechanism B can be used to make the phase of the cam of the intake valve drive-use cam shaft 70 advance or can be used to make it delayed by exactly a desired amount.

Figure 5:
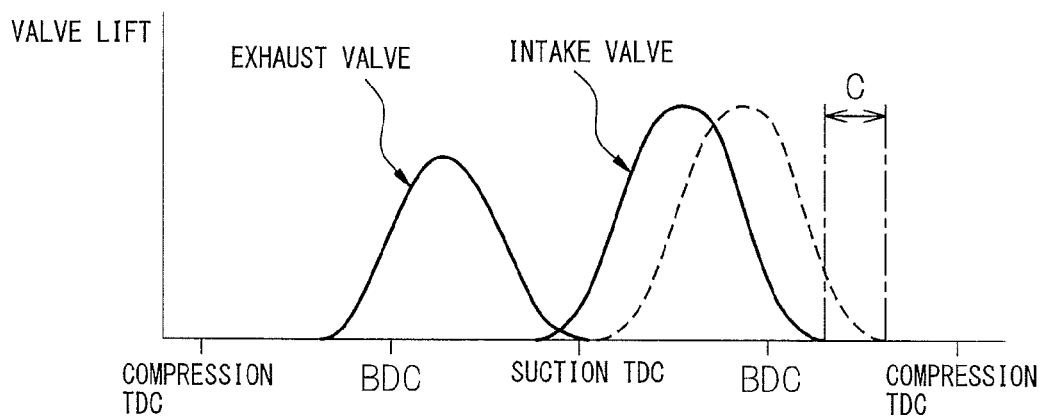
FIG. 5 is a view which shows lift amounts of an intake valve and an exhaust valve.

In FIG. 5, the solid line shows when the variable valve timing mechanism B is used to make the phase of the cam of the intake valve drive-use cam shaft 70 the most advanced, while the broken line shows when it is used to make the phase of the cam of the intake valve drive-use cam shaft 70 the most delayed. Therefore, the opening time period of the intake valve 7 can be freely set between the range which is shown by the solid line and the range which is shown by the broken line in FIG. 5. Therefore, the closing timing of the intake valve 7 can also be set to any crank angle in the range which is shown by the arrow C in FIG. 5.

The variable valve timing mechanism B which is shown in FIG. 1 and FIG. 4 shows one example. For example, it is possible to use a variable valve timing mechanism which enables only the closing timing of the intake valve to be changed while maintaining the opening timing of the intake valve constant or various other types of variable valve timing mechanisms.

Figure 6A:
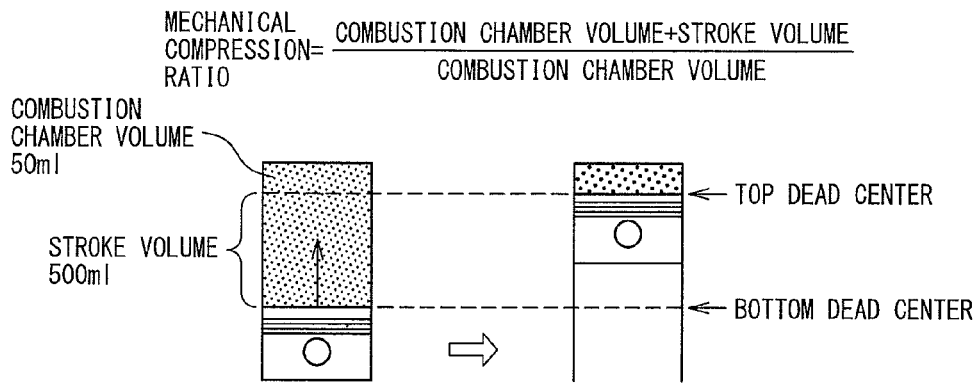
FIGS. 6(A) to 6(C) are views for explaining an mechanical compression ratio, actual compression ratio, and expansion ratio.
Figure 6B:
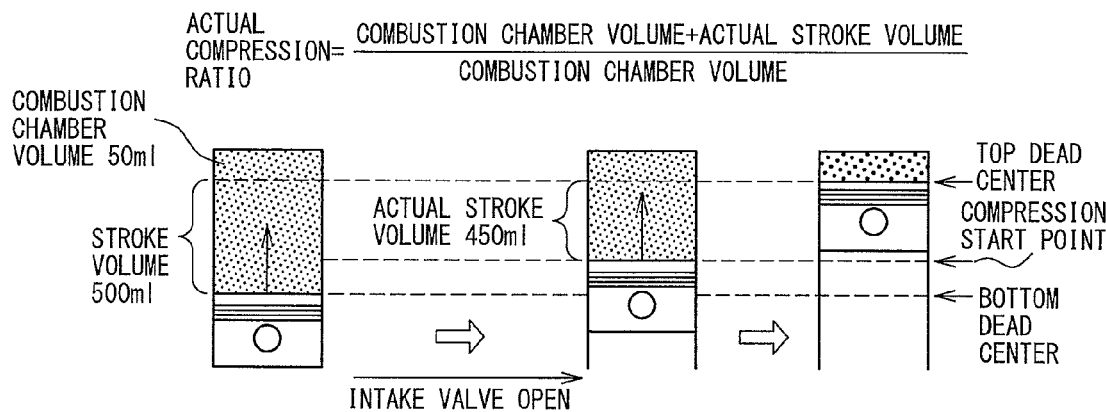
Figure 6C:
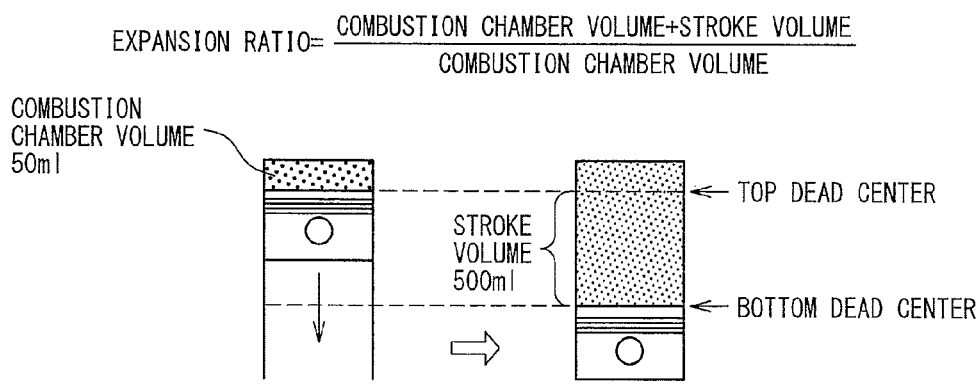

Next, referring to FIGS. 6(A) to 6(C), the meaning of the terms which are used in the present application will be explained. Note that, FIGS. 6(A), 6(B), and 6(C) show engines with combustion chamber volumes of 50 ml and piston stroke volumes of 500 ml for explanatory purposes. In these FIGS. 6(A), 6(B), and 6(C), the "combustion chamber volume" expresses the volume of a combustion chamber when the piston is positioned at top dead center of the compression stroke.

FIG. 6(A) explains the mechanical compression ratio. The mechanical compression ratio is a value which is mechanically determined from only the piston stroke volume at the time of the compression stroke and the combustion chamber volume. This mechanical compression ratio is expressed by (combustion chamber volume+stroke volume)/combustion chamber volume. In the example which is shown in FIG. 6(A), this mechanical compression ratio becomes (50 ml+500 ml)/50 ml=11.

FIG. 6(B) explains the actual compression ratio. This actual compression ratio is a value which is determined from the actual piston stroke volume from when the compression action actually is started to when the piston reaches top dead center and the combustion chamber volume. This actual compression ratio is expressed by (combustion chamber volume+actual stroke volume)/combustion chamber volume. That is, as shown in FIG. 6(B), even if the piston starts to rise in the compression stroke, no compression action is performed while the intake valve is open. The actual compression action is started after the intake valve closes. Therefore, the actual compression ratio is expressed as shown above using the actual stroke volume. In the example which is shown in FIG. 6(B), the actual compression ratio becomes (50 ml+450 ml)/50 ml=10.

FIG. 6(C) explains the expansion ratio. The expansion ratio is a value which is determined from the stroke volume of the piston and the combustion chamber volume at the time of the expansion stroke. This expansion ratio is expressed by the (combustion chamber volume +stroke volume)/combustion chamber volume. In the example which is shown in FIG. 6(C), this expansion ratio becomes (50 ml+500 ml)/50 ml=11.

Next, while referring to FIG. 7 and FIGS. 8(A) and 8(B), the super expansion ratio cycle which is used in the present invention will be explained. Note that, FIG. 7 shows the relationship between the theoretical thermal efficiency and the expansion ratio, while FIGS. 8(A) and 8(B) show a comparison between a normal cycle and a superhigh expansion ratio cycle which are selectively used in accordance with the load in the present invention.

Figure 8A:
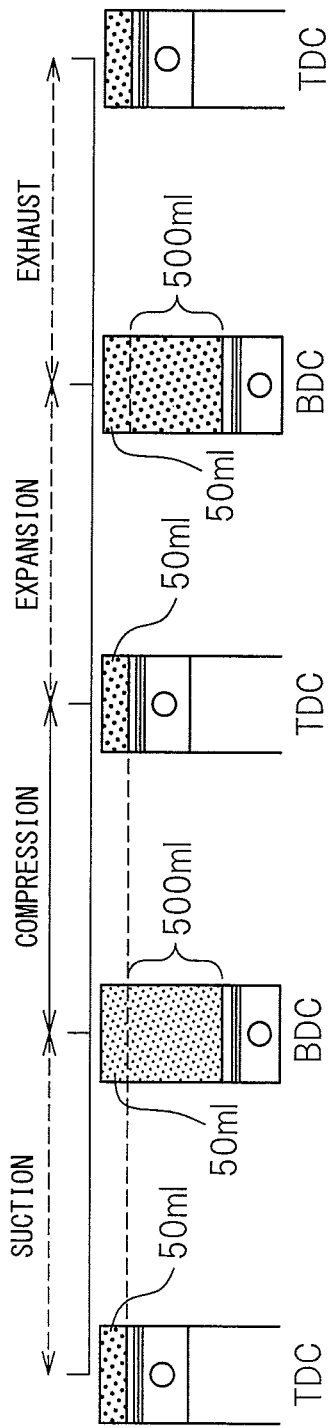
FIGS. 8(A) and 8(B) are views for explaining a normal cycle and superhigh expansion ratio cycle.

FIG. 8(A) shows the normal cycle in the case where the intake valve closes near bottom dead center and the compression action by the piston is started from near substantially bottom dead center of the intake stroke. In the example which is shown in FIG. 8(A), in the same way as the examples which are shown in FIGS. 6(A), (B), (C), the combustion chamber volume is made 50 ml and the piston stroke volume is made 500 ml. As will be understood from FIG. 8(A), in the normal cycle, the mechanical compression ratio is (50 ml+500 ml)/50 ml=11, the actual compression ratio is also about 11, and the expansion ratio also becomes (50 ml+500 ml)/50 ml=11. That is, in a normal internal combustion engine, the mechanical compression ratio, the actual compression ratio, and the expansion ratio become substantially equal.

Figure 7:
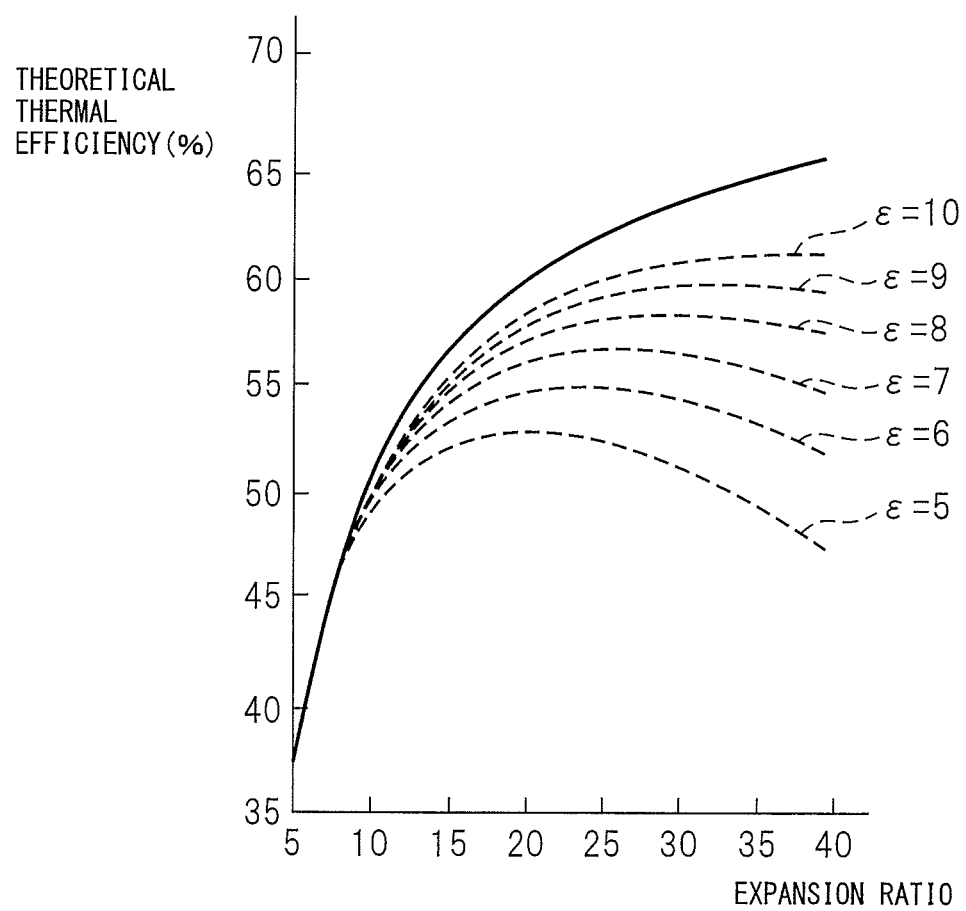
FIG. 7 is a view which shows a relationship between a theoretical thermal efficiency and an expansion ratio.
Figure 8B:
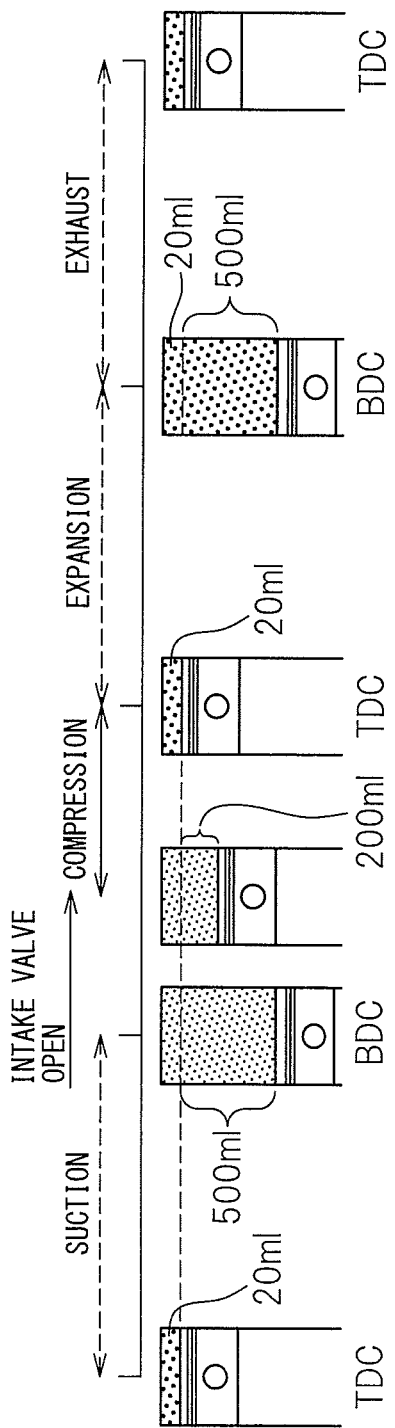

The solid line in FIG. 7 shows the change in the theoretical thermal efficiency in the case where the actual compression ratio and the expansion ratio are substantially equal, that is, at the time of a normal cycle. In this case, it is learned that the larger the expansion ratio becomes, that is, the higher the actual compression ratio becomes, the higher the theoretical thermal efficiency becomes. Therefore, in the normal cycle, to raise the theoretical thermal efficiency, it is sufficient to raise the actual compression ratio. However, due to restrictions on the occurrence of knocking at the time of engine high load operation, the actual compression ratio can only be raised up to about 12 even at the maximum. Therefore, in a normal cycle, the theoretical thermal efficiency cannot be made sufficiently high.

On the other hand, in view of this situation, studies have been conducted to strictly separate the mechanical compression ratio and the actual compression ratio while raising the theoretical thermal efficiency. As a result, it was discovered that in the theoretical thermal efficiency, the expansion ratio is dominant and that the actual compression ratio does not have almost any effect on the theoretical thermal efficiency. That is, if raising the actual compression ratio, the explosive force rises, but a large energy is required for compression. Therefore, even if raising the actual compression ratio, the theoretical thermal efficiency does not become much larger at all.

As opposed to this, if increasing the expansion ratio, the time period during which a pushdown force acts on the piston at the time of the expansion stroke becomes longer and therefore the time period during which the piston gives a rotational force to the crankshaft becomes longer. Therefore, the greater the expansion ratio is made, the more the theoretical thermal efficiency rises. The broken line $\epsilon$=10 of FIG. 7 shows the theoretical thermal efficiency when raising the expansion ratio in the state setting the actual compression ratio at 10. In this way, it is learned that there is no large difference between the amount of rise of the theoretical thermal efficiency when raising the expansion ratio in the state maintaining the actual compression ratio $\epsilon$ at a low value and the amount of rise of the theoretical thermal efficiency when making the actual compression ratio increase together with the expansion ratio as shown by the solid line of FIG. 7.

If the actual compression ratio is maintained at a low value in this way, knocking will never occur. Therefore, if raising the expansion ratio in a state maintaining the actual compression ratio at a low value, it is possible to prevent the occurrence of knocking while greatly raising the theoretical thermal efficiency. FIG. 8(B) shows one example of using the variable compression ratio mechanism A and the variable valve timing mechanism B to maintain the actual compression ratio at a low value while raising the expansion ratio.

If referring to FIG. 8(B), in this example, the variable compression ratio mechanism A is used to decrease the combustion chamber volume from 50 ml to 20 ml. On the other hand, the variable valve timing mechanism B is used to delay the closing timing of the intake valve until the actual piston stroke volume is reduced from 500 ml to 200 ml. As a result, in this example, the actual compression ratio becomes (20 ml+200 ml)/20 ml=11, while the expansion ratio becomes (20 ml+500 ml)/20 ml=26. In the normal cycle which is shown in FIG. 8(A), as explained above, the actual compression ratio becomes about 11 and the expansion ratio becomes 11. If compared with this case, in the case which is shown in FIG. 8(B), it is learned that only the expansion ratio is raised to 26. This is called the "superhigh expansion ratio cycle".

Generally speaking, in an internal combustion engine, the lower the engine load, the worse the thermal efficiency. Therefore, to improve the thermal efficiency at the time of engine operation, that is, to improve the fuel economy, it is necessary to raise the thermal efficiency when the engine load is low. On the other hand, in the superhigh expansion ratio cycle, which is shown in FIG. 8(B), to enable the actual piston stroke volume at the time of the compression stroke to be made smaller, the amount of intake air which is sucked into a combustion chamber 5 becomes smaller. Therefore, this superhigh expansion ratio cycle can be employed only when the engine load is relatively low. Therefore, in the present invention, when the engine load is relatively low, the superhigh expansion ratio cycle, which is shown in FIG. 8(B) is used, while at the time of the engine high load operation, the normal cycle which is shown in FIG. 8(A) is used.

Next, referring to FIG. 9, the operational control as a whole will be schematically explained. FIG. 9 shows the changes in the intake air amount, intake valve closing timing, mechanical compression ratio, expansion ratio, actual compression ratio, and opening degree of the throttle valve 17 in accordance with the engine load at a certain engine speed. Note that, FIG. 9 shows the case where the mean air-fuel ratio in a combustion chamber 5 is feedback controlled to the stoichiometric air-fuel ratio based on the output signal of the air-fuel ratio sensor 21 so that the three-way catalyst in the catalyst device 20 can be used to simultaneously reduce the unburned HCs, CO, and $NO_x$ in the exhaust gas.

As explained above, at the time of engine high load operation, the normal cycle which is shown in FIG. 8(A) is performed. Therefore, as shown in FIG. 9, at this time, the mechanical compression ratio is made low, so the expansion ratio is low. As shown by the solid line in FIG. 9, the closing timing of the intake valve 7 is advanced as shown by the solid line in FIG. 5. Further, at this time, the amount of intake air is large. At this time, the opening degree of the throttle valve 17 is held wide open, so the pumping loss becomes zero.

On the other hand, as shown in FIG. 9 by the solid line, if the engine load becomes lower, along with this, the closing timing of the intake valve 7 is delayed so as to reduce the amount of intake air. Further, at this time, the mechanical compression ratio is increased as the engine load becomes lower as shown in FIG. 9 so that the actual compression ratio is held substantially constant. Therefore, the expansion ratio is also increased as the engine load becomes lower. Note that, at this time as well, the throttle valve 17 is held in the wide open state. Therefore the amount of intake air which is supplied to the inside of the combustion chamber 5 is controlled without relying on the throttle valve 17 and by changing the closing timing of the intake valve 7.

In this way, when the engine load becomes lower from the engine high load operation state, the mechanical compression ratio is made to increase under a substantially constant actual compression ratio as the amount of intake air decreases. That is, the volume of the combustion chamber 5 when the piston 4 reaches compression top dead center is made to decrease in proportion to the decrease in the amount of intake air. Therefore, the volume of the combustion chamber 5 when the piston 4 reaches compression top dead center changes in proportion to the amount of intake air. Note that, at this time, in the example which is shown in FIG. 9, the air-fuel ratio in the combustion chamber 5 becomes the stoichiometric air-fuel ratio, so the volume of the combustion chamber 5 when the piston 4 reaches compression top dead center changes in proportion to the amount of fuel.

If the engine load becomes further lower, the mechanical compression ratio is made to further increase. If the engine load falls down to the intermediate load L1 somewhat near the low load, the mechanical compression ratio reaches the limit mechanical compression ratio (upper limit mechanical compression ratio) forming the structural limit of the combustion chamber 5. When the mechanical compression ratio reaches the limit mechanical compression ratio, in the region with a load lower than the engine load L1 when the mechanical compression ratio reaches the limit mechanical compression ratio, the mechanical compression ratio is held at the limit mechanical compression ratio. Therefore, at the time of low load side engine medium load operation and at the time of engine low load operation, that is, at the engine low load operation side, the mechanical compression ratio becomes maximum and the expansion ratio also becomes maximum. In other words, at the engine low load operation side, the mechanical compression ratio is made maximum so that the maximum expansion ratio is obtained.

On the other hand, in the embodiment which is shown in FIG. 9, if the engine load falls to L1, the closing timing of the intake valve 7 becomes the limit closing timing by which the amount of intake air which is supplied to the inside of a combustion chamber 5 can be controlled. If the closing timing of the intake valve 7 reaches the limit closing timing, in the region of a lower load than the engine load L1 when the closing timing of the intake valve 7 reached the limit closing timing, the closing timing of the intake valve 7 is held at the limit closing timing.

If the closing timing of the intake valve 7 is held at the limit closing timing, it is no longer possible to control the intake air amount by changing the closing timing of the intake valve 7. In the embodiment which is shown in FIG. 9, at this time, that is, in the region of a load lower than the engine load L1 when the closing timing of the intake valve 7 reaches the limit closing timing, the throttle valve 17 is used to control the amount of intake air which is supplied to the inside of the combustion chamber 5. The lower the engine load is, the smaller the opening degree of the throttle valve 17 is made.

On the other hand, as shown by the broken line in FIG. 9, it is possible to control the amount of intake air without relying on the throttle valve 17 by advancing the closing timing of the intake valve 7 as the engine load becomes lower as shown by the broken line in FIG. 9. Therefore, if expressing the invention to be able to include both the case which is shown by the solid line in FIG. 9 and the case which is shown by the broken line, in the embodiment according to the present invention, as the engine load becomes lower, the closing timing of the intake valve 7 is made to move in a direction away from suction bottom dead center BDC until the limit closing timing L1 where the amount of intake air which is supplied to the inside of the combustion chamber can be controlled. In this way, the intake air amount can be controlled by changing the closing timing of the intake valve 7 as shown by the solid line in FIG. 9 and can be controlled by changing it as shown by the broken line.

As explained above, in the superhigh expansion ratio cycle which is shown in FIG. 8(B), the expansion ratio is made 26. This expansion ratio is preferably as high as possible, but as will be understood from FIG. 7, a considerably high theoretical thermal efficiency can be obtained if 20 or more compared with the practically usable lower limit actual compression ratio $\epsilon=5$. Therefore in the present embodiment, the variable compression ratio mechanism A is formed so that the expansion ratio becomes 20 or more.

In the internal combustion engine of the present embodiment, as shown in FIG. 9, a target mechanical compression ratio is set for the current engine load. For the actuator of the variable compression ratio mechanism A, that is, the drive motor 59, to realize the current target mechanical compression ratio, the actuating amount is controlled to become an actuating amount corresponding to the current target mechanical compression ratio. The actuating amount of the drive motor 59 (number of rotations having parts below decimal place) may be detected directly by a specific sensor (not shown), but may also be indirectly detected based on the relative positions between the crankcase 1 and cylinder block 2 which are detected by the above-mentioned relative position sensor 22 or the rotational angle of the cam shaft 55 which is detected by the above-mentioned cam rotational angle sensor 25.

However, even if the actuator of the variable compression ratio mechanism A is controlled in this way, in actuality, the current target mechanical compression ratio is sometimes not realized. If the target mechanical compression ratio is not realized, the current desired expansion ratio is also not realized and the thermal efficiency also cannot be sufficiently raised.

Figure 10:
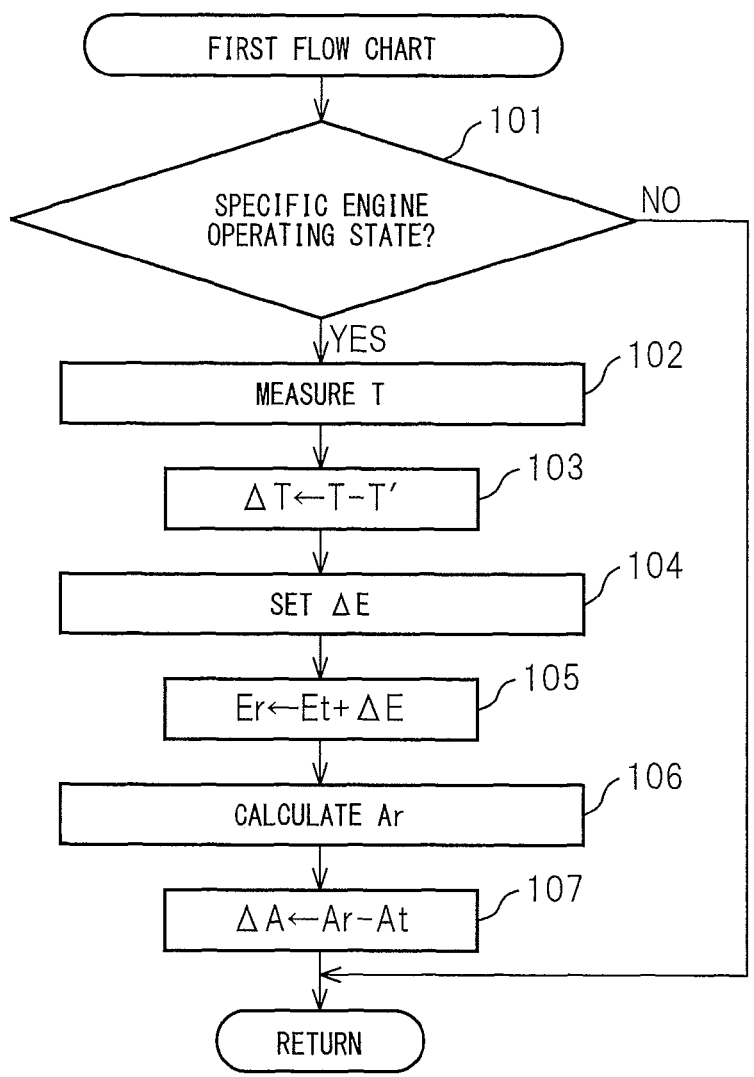
FIG. 10 is a first flow chart for estimating an actual mechanical compression ratio.

The internal combustion engine which is provided with a variable compression ratio mechanism of the present embodiment is designed to estimate the current mechanical compression ratio in the specific engine operating state based on the first flow chart which is shown in FIG. 10. First, at step 101, the current engine load which is detected by the load sensor 41 and the current engine speed which is detected by the crank angle sensor 42 are used as the basis to judge if the current steady engine operating state where the engine load and the engine speed are not changing is the specific engine operating state. When this judgment is no, the routine ends as is, but when the specific engine operating state, the judgment of step 101 is yes. At step 102, the temperature sensor 28 is used to detect the current exhaust gas temperature T, which changes in accordance with the actual expansion ratio.

Figure 11:
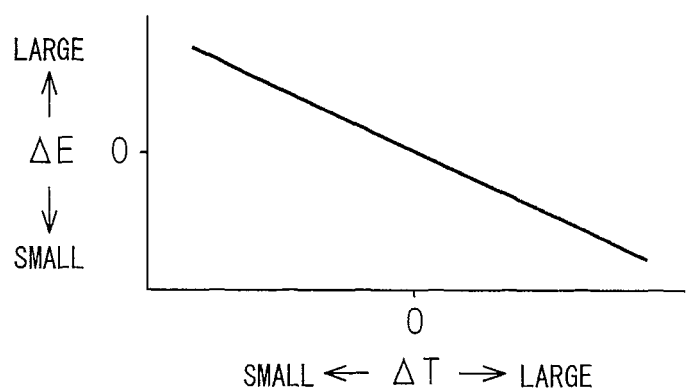
FIG. 11 is a map for setting a correction amount of a mechanical compression ratio which is used in a first flow chart.

Next, at step 103, the temperature difference $\Delta T$ between the current exhaust gas temperature T and the ideal exhaust gas temperature T' when the target mechanical compression ratio is realized in the specific engine operating state is calculated. Next, at step 104, the map which is shown in FIG. 11 is used as the basis to set the mechanical compression ratio correction amount $\Delta E$ for the temperature difference $\Delta T$. In the map of FIG. 11, if the temperature difference $\Delta T$ is 0, that is, if the current exhaust gas temperature T is equal to the ideal exhaust gas temperature T', the target mechanical compression ratio is realized, the desired expansion ratio is also realized, and the mechanical compression ratio correction amount $\Delta E$ becomes 0. However, when the temperature difference $\Delta T$ is larger than 0, the current exhaust gas temperature T is higher than the ideal exhaust gas temperature T', the current mechanical compression ratio is lower than the target mechanical compression ratio, the expansion ratio becomes lower than the desired value, and the thermal efficiency deteriorates. Further, when the temperature difference $\Delta T$ is smaller than 0, the current exhaust gas temperature T is lower than the ideal exhaust gas temperature T', so the current mechanical compression ratio becomes higher than the target mechanical compression ratio, the expansion ratio also becomes higher than the desired value, and the thermal efficiency is improved more than necessary. Further, at this time, the actual compression ratio becomes higher than the constant value which is shown in FIG. 9 and knocking easily occurs.

In the map which is shown in FIG. 11, overall, the larger the temperature difference $\Delta T$, the smaller the mechanical compression ratio correction amount $\Delta E$ is set to become. When the temperature difference $\Delta T$ is larger than 0, the mechanical compression ratio correction amount $\Delta E$ is made a minus value, while when the temperature difference $\Delta T$ is smaller than 0, the mechanical compression ratio correction amount $\Delta E$ is made a plus value.

Next, at step 105, the current actual mechanical compression ratio Er is calculated by adding the mechanical compression ratio correction amount $\Delta E$ which was set at step 104 to the current target mechanical compression ratio Et. In this way, the actual mechanical compression ratio Er at the time of the specific engine operating state can be estimated.

Of course, if the ideal exhaust gas temperature T' where the target mechanical compression ratio is realized is set at each engine operating state in advance in a map etc., the temperature difference $\Delta T$ from the current exhaust gas temperature T can be calculated. As a result, in each engine operating state, if a map of the mechanical compression ratio correction amount $\Delta E$ for temperature difference $\Delta T$ such as shown in FIG. 11 is set, the current actual mechanical compression ratio can be estimated at each engine operating state.

At step 106, the actuating amount Ar of the actuator of the variable compression ratio mechanism A corresponding to the estimated current actual mechanical compression ratio Er is calculated. Next, at step 107, the difference between the actuating amount Ar which was calculated at step 106 and the target actuating amount At of the actuator corresponding to the current (specific engine operating state) target mechanical compression ratio Et is calculated as the actuating amount correction amount $\Delta A$.

The thus calculated actuating amount correction amount $\Delta A$ is an amount of deviation between the actual actuating amount of the actuator and the actuating amount of the actuator which is calculated based on the output of a detection device such as the relative position sensor 22 or the cam rotational angle sensor 25. By correcting by addition the actuating amount which is calculated based on the output of the detection device, it is possible to calculate the current actual actuating amount. Due to this, if controlling the actuator of the variable compression ratio mechanism A so that the thus corrected actuating amount becomes an actuating amount corresponding to the target mechanical compression ratio of each engine operating state, it is possible to realize the target mechanical compression ratio at each engine operating state.

Figure 12:
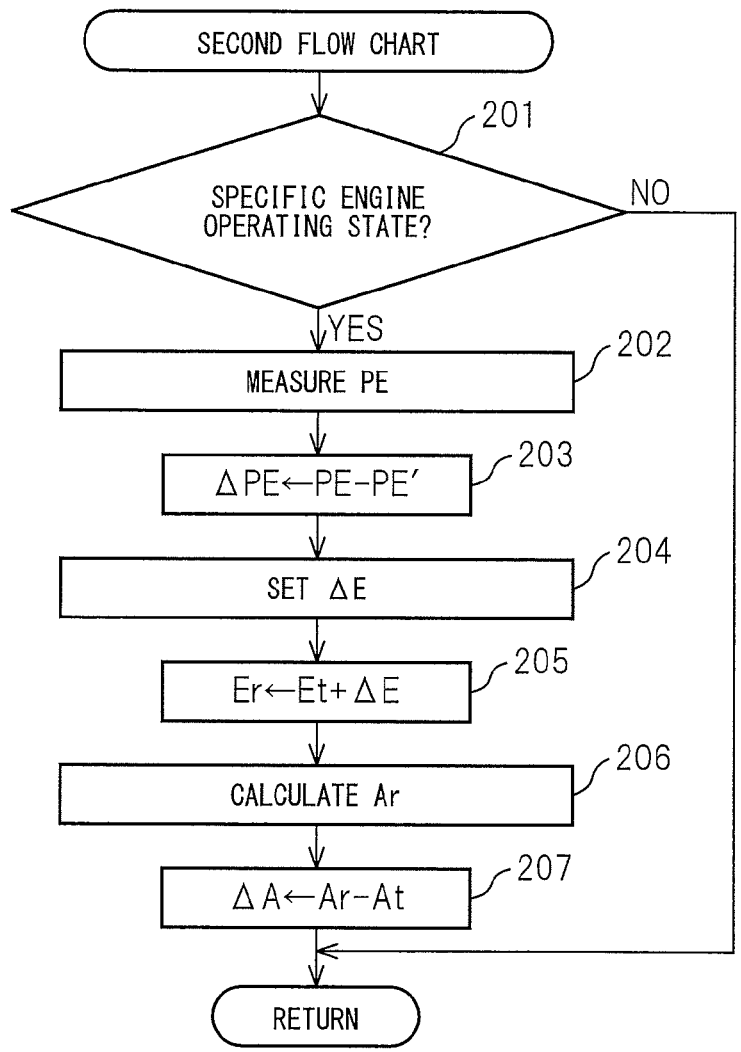
FIG. 12 is a second flow chart for estimating an actual mechanical compression ratio.

Further, the internal combustion engine which is provided with a variable compression ratio mechanism of the present embodiment enables estimation of the current mechanical compression ratio at the specific engine operating state by the second flow chart which is shown in FIG. 12. First, at step 201, the current engine load which is detected by the load sensor 41 and the current engine speed which is detected by the crank angle sensor 42 are used as the basis to judge if the current steady engine operating state is a specific engine operating state. When this judgment is no, the routine is ended as it is, but when a specific engine operating state, the judgment of step 201 is yes. At step 202, the pressure sensor 29 is used to detect the current exhaust gas pressure PE which changes according to the actual expansion ratio.

Figure 13:
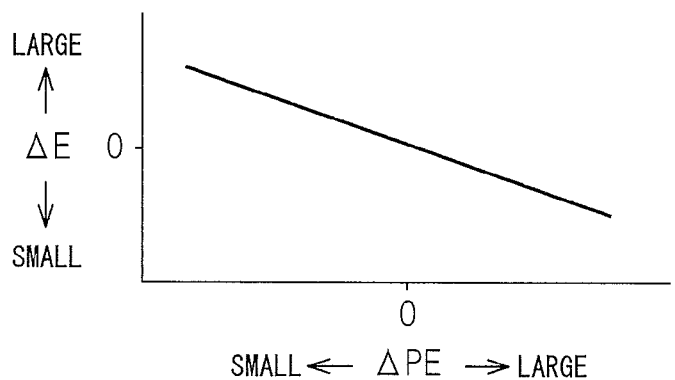
FIG. 13 is a map for setting a correction amount of a mechanical compression ratio which is used in a second flow chart.

Next, at step 203, the pressure difference $\Delta PE$ between the current exhaust gas pressure PE and the ideal exhaust gas pressure PE' when the target mechanical compression ratio is realized at the specific engine operating state is calculated. Next, at step 204, the map which is shown in FIG. 13 is used as the basis to set the mechanical compression ratio correction amount $\Delta E$ for the pressure difference $\Delta PE$. In the map of FIG. 13, if the pressure difference $\Delta PE$ is 0, that is, if the current exhaust gas pressure PE is the ideal exhaust gas pressure PE', the target mechanical compression ratio is realized, the desired expansion ratio is also realized, and the mechanical compression ratio correction amount $\Delta E$ becomes 0. However, when the pressure difference $\Delta PE$ is larger than 0, the current exhaust gas pressure PE is higher than the ideal exhaust gas pressure PE', so the current mechanical compression ratio becomes lower than the target mechanical compression ratio and the expansion ratio also becomes lower than the desired value and the thermal efficiency deteriorates. Further, when the pressure difference ΔPE is smaller than 0, the current exhaust gas pressure PE is lower than the ideal exhaust gas pressure PE', so the current mechanical compression ratio becomes higher than the target mechanical compression ratio and the expansion ratio also becomes higher than the desired value, so the thermal efficiency is improved more than necessary. Further, at this time, the actual compression ratio becomes higher than the constant value shown in FIG. 9 and knocking easily occurs.

In the map which is shown in FIG. 13, overall, the larger the pressure difference ΔPE, the smaller the mechanical compression ratio correction amount ΔE is set. When the pressure difference ΔPE is larger than 0, the mechanical compression ratio correction amount ΔE is made a minus value, while when the pressure difference ΔPE is smaller than 0, the mechanical compression ratio correction amount ΔE is made a plus value.

Next, at step 205, the current actual mechanical compression ratio Er is calculated by adding the mechanical compression ratio correction amount ΔE which was set at step 204 to the current target mechanical compression ratio Et. In this way, it is possible to estimate the actual mechanical compression ratio Er at the time of a specific engine operating state.

However, if the ideal exhaust gas pressure PE' when the target mechanical compression ratio is realized is set at each engine operating state in advance in a map etc., it is possible to calculate the pressure difference ΔPE with the current exhaust gas pressure PE. As a result, if a map of the mechanical compression ratio correction amount ΔE with respect to the pressure difference ΔPE such as shown in FIG. 13 is set at each engine operating state, it is possible to estimate the current actual mechanical compression ratio at each engine operating state.

At step 206, the actuating amount Ar of the actuator of the variable compression ratio mechanism A which corresponds to the estimated current actual mechanical compression ratio Er is calculated. Next, at step 207, the difference between the actuating amount Ar which was calculated at step 206 and the target actuating amount At of the actuator which corresponds to the current (specific engine operating state) target mechanical compression ratio Et is calculated as the actuating amount correction amount ΔA.

The thus calculated actuating amount correction amount ΔA is the amount of deviation between the actual actuating amount of the actuator and the actuating amount of the actuator which is calculated based on the output of a detection device such as the relative position sensor 22 or cam rotational angle sensor 25. By using the output of the detection device as the basis to correct by addition the calculated actuating amount, it is possible to calculate the current actual actuating amount. Due to this, if controlling the actuator of the variable compression ratio mechanism A so that the corrected actuating amount becomes an actuating amount corresponding to the target mechanical compression ratio at each engine operating state, it is possible to realize the target mechanical compression ratio at each engine operating state.

Figure 14:
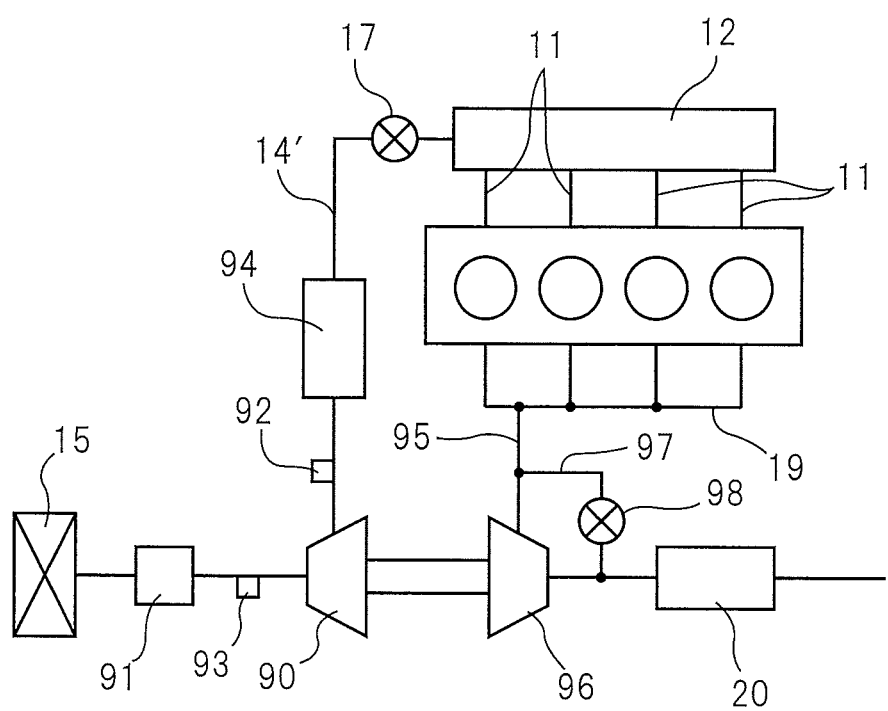
FIG. 14 is a schematic overview of an internal combustion engine in the case where a turbocharger is arranged.

FIG. 14 is a schematic overall view of the case where an internal combustion engine which is provided with a variable compression ratio mechanism has a turbocharger. In the figure, members which were explained in FIG. 1 are assigned the same reference numerals and explanations will be omitted. In the present embodiment, the intake duct 14' between the surge tank 12 and the air cleaner 15 has a compressor 90 of the turbocharger arranged at it. At the upstream side of the compressor 90 of the turbocharger, the compressor 91 of the supercharger is arranged.

The compressor 90 of the turbocharger cannot sufficiently raise the supercharging pressure when the exhaust pressure is low such as the time of engine low speed. To assist the supercharging of the turbocharger at the time of engine low speed, the compressor 91 of the supercharger is provided.

The compressor 91 of the supercharger is an engine driven type. It is connected to an engine drive shaft through a solenoid clutch (not shown) and can be stopped by disengaging it from the engine drive shaft by the solenoid clutch.

If the compressor 91 of the supercharger is designed to be efficiently driven by the engine drive shaft at the time of engine low speed operation, it can be damaged by excessive rotation at the time of engine high speed operation, so the compressor 91 of the supercharger is disengaged from the engine drive shaft by the solenoid clutch if the engine speed becomes a set speed or more.

92 is a supercharging pressure sensor for measuring the intake pressure at the downstream side of the compressor 90 of the turbocharger of the intake duct 14' as the supercharging pressure, while 93 is an intake pressure sensor for measuring the intake pressure of the intake duct 14' between the compressor 90 of the turbocharger and the compressor 91 of the supercharger. 94 is an intercooler for cooling the intake which is supercharged by the compressor 90 of the turbocharger.

On the other hand, at the exhaust duct 95 at the downstream side of the exhaust manifold 19, a turbine 96 of the turbocharger is arranged at the upstream side of the catalyst device 20. 97 is a wastegate passage which bypasses the turbine 96, while a wastegate valve 98 which controls the amount of exhaust which passes through the wastegate passage 97 is arranged at the wastegate passage 97.

Figure 15:
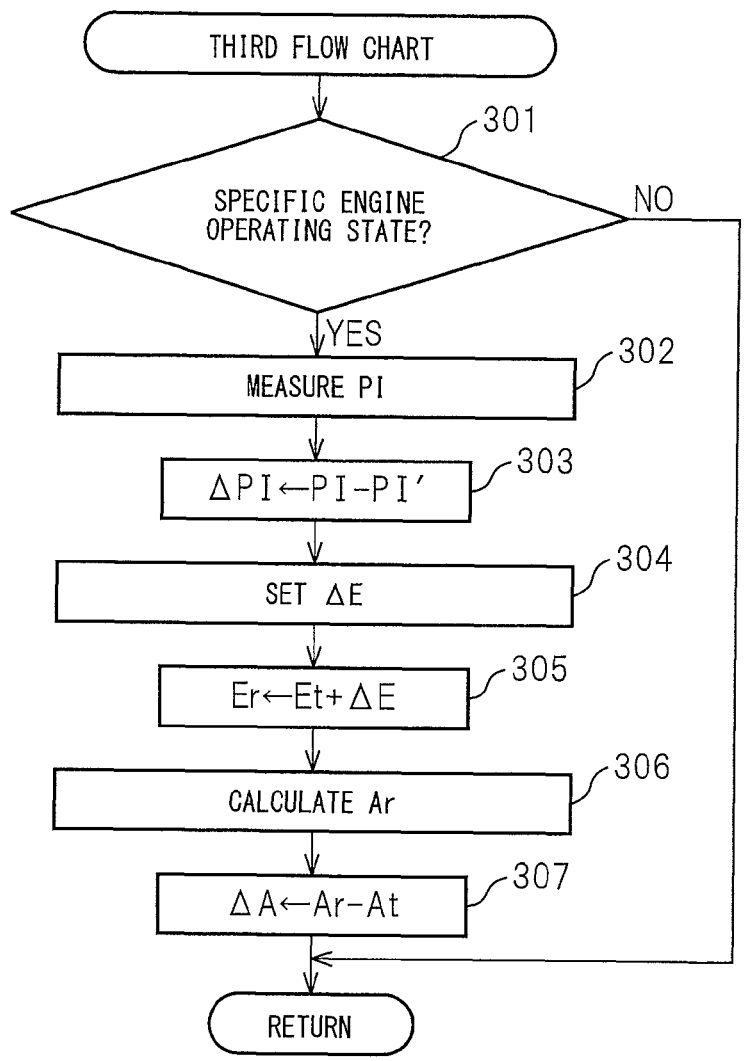
FIG. 15 is a third flow chart for estimating an actual mechanical compression ratio.

The internal combustion engine which is provided with a variable compression ratio mechanism of the present embodiment is designed to use the third flow chart which is shown in FIG. 15 to estimate the current mechanical compression ratio at a specific engine operating state. First, at step 301, the current engine load which is detected by the load sensor 41 and the current engine speed which is detected by the crank angle sensor 42 is used as the basis to judge if the current steady engine operating state is in the specific engine operating state. When this judgment is no, the routine is ended as it is, but when in a specific engine operating state, the judgment of step 301 is yes. At step 302, the supercharging pressure sensor 92 is used to detect the current supercharging pressure PI of the turbocharger which changes in accordance with the exhaust temperature and exhaust pressure.

When the compressor 91 of the supercharger is not provided or the compressor 91 of the supercharger does not operate in the specific engine operating state, the current supercharging pressure PI which is detected by the supercharging pressure sensor 92 becomes a physical quantity which changes in accordance with the actual expansion ratio, but when the compressor 91 of the supercharger is used for supercharging, it is necessary to eliminate that effect. Specifically, as the supercharging pressure PI, the differential pressure before and after the compressor 90 of the turbocharger, that is, the differential pressure between the pressure which is detected by the supercharging pressure sensor 92 and the pressure which is detected by the intake pressure sensor 93, is detected.

Figure 16:
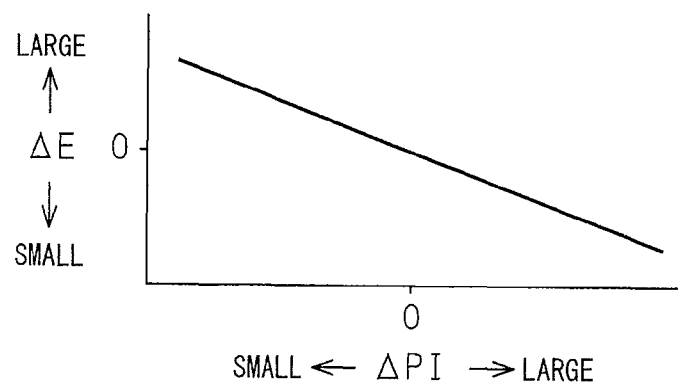
FIG. 16 is a map for setting a correction amount of a mechanical compression ratio which is used in a third flow chart.

Next, at step 303, the supercharging pressure difference ΔPI between the current supercharging pressure PI and the ideal supercharging pressure PI' when the target mechanical compression ratio is realized in a specific engine operating state is calculated. Next, at step 304, the map which is shown in FIG. 16 is used as the basis to set the mechanical compression ratio correction amount ΔE for the supercharging pressure difference ΔPI. In the map of FIG. 16, if the supercharging pressure difference ΔPI is 0, that is, if the current supercharging pressure PI is equal to the ideal supercharging pressure PI', the target mechanical compression ratio is realized, the desired expansion ratio is also realized, and the mechanical compression ratio correction amount ΔE becomes zero. However, when the supercharging pressure difference ΔPI is larger than 0, the current supercharging pressure PI is higher than the ideal supercharging pressure PI', so the current mechanical compression ratio becomes lower than the target mechanical compression ratio, the expansion ratio also becomes lower than the desired value, and the thermal efficiency deteriorates. Further, when the supercharging pressure difference ΔPI is smaller than 0, the current supercharging pressure PI is lower than the ideal supercharging pressure PI', the current mechanical compression ratio becomes higher than the target mechanical compression ratio, the expansion ratio also becomes higher than the desired value, and the thermal efficiency is improved more than necessary. Further, at this time, the actual compression ratio becomes higher than the constant value which is shown in FIG. 9 and knocking easily occurs.

In the map which is shown in FIG. 16, overall, the larger the supercharging pressure difference ΔPI, the smaller the mechanical compression ratio correction amount ΔE is set to be. When the supercharging pressure difference ΔPI is larger than 0, the mechanical compression ratio correction amount ΔE is made a minus value, while when the supercharging pressure difference ΔPI is smaller than 0, the mechanical compression ratio correction amount ΔE is made a plus value.

Next, at step 305, the current actual mechanical compression ratio Er is calculated by adding the mechanical compression ratio correction amount ΔE which is set at step 304 to the current target mechanical compression ratio Et. In this way, it is possible to estimate the actual mechanical compression ratio Er at the time of the specific engine operating state.

However, if the ideal supercharging pressure PI' when the respective target mechanical compression ratios are realized is set at each engine operating state in a map etc. in advance, the supercharging pressure difference ΔPI relating to the current supercharging pressure PI can be calculated. As a result, if a map of the mechanical compression ratio correction amount ΔE for the supercharging pressure difference ΔPI such as shown in FIG. 16 is set at each engine operating state, it is possible to estimate the current actual mechanical compression ratio at each engine operating state.

At step 306, the actuating amount Ar of the actuator of the variable compression ratio mechanism A corresponding to the estimated current actual mechanical compression ratio Er is calculated. Next, at step 307, the difference between the actuating amount Ar which was calculated at step 306 and the target actuating amount At of the actuator corresponding to the current (specific engine operating state) target mechanical compression ratio Et is calculated as the actuating amount correction amount ΔA.

The thus calculated actuating amount correction amount ΔA is an amount of deviation between the actual actuating amount of the actuator and the actuating amount of the actuator which is calculated based on the output of a detection device such as the relative position sensor 22 or cam rotational angle sensor 25. By correcting by addition the actuating amount which is calculated based on the output of the detection device, the current actual actuating amount can be calculated. Due to this, if controlling the actuator of the variable compression ratio mechanism A so that the thus corrected actuating amount becomes an actuating amount corresponding to the target mechanical compression ratio at each engine operating state, it is possible to realize the target mechanical compression ratio at each engine operating state.

In the present embodiment, as the physical quantity which changes in accordance with at least one of the exhaust temperature and exhaust pressure, which change in accordance with the actual expansion ratio, the supercharging pressure of the turbocharger is measured and the measured supercharging pressure is used as the basis to estimate the current mechanical compression ratio. The supercharging pressure at the downstream side of the compressor 90 of the turbocharger can be measured using a generally provided supercharging pressure sensor 92. It is not necessary to newly provide a sensor for measuring a physical quantity.

Further, as the physical quantity which changes in accordance with at least one of the exhaust temperature and exhaust pressure, which change in accordance with the actual expansion ratio, for estimating the current mechanical compression ratio, in addition to the supercharging pressure of the turbocharger, the speed of the turbine of the turbocharger etc. can also be measured.

In the first, second, and third flow charts, the specific engine operating state is preferably made an engine operating state whereby the target mechanical compression ratio becomes the set mechanical compression ratio or less. In this way, if the target mechanical compression ratio is small, the exhaust temperature or the exhaust pressure changes relatively largely according to the slight deviation in mechanical compression ratio when the target mechanical compression ratio is not realized, so it is possible to accurately detect a slight deviation in the mechanical compression ratio and possible to accurately correct the actuating amount A of the actuator of the variable compression ratio mechanism A which is detected by the detection device.

In the third flow chart, the supercharging pressure difference ΔPI between the supercharging pressure PI of the turbocharger which is measured at the time of a specific engine operating state (when a supercharger is provided, differential pressure before and after the compressor 90 of the turbocharger) and the ideal supercharging pressure PI' of the turbocharger when the desired expansion ratio of the specific engine operating state is realized is used as the basis to estimate the actual mechanical compression ratio of the specific engine operating state.

However, strictly speaking, due to individual differences, for each turbocharger, sometimes deviation occurs in the measurement value PI of the supercharging pressure in a specific engine operating state. Due to this, by using the supercharging pressure true value PIr where this amount of deviation is eliminated instead of the measurement value PI at step 303 of the third flow chart to calculate the supercharging pressure difference ΔPI, it is possible to accurately estimate the mechanical compression ratio.

Figure 17:
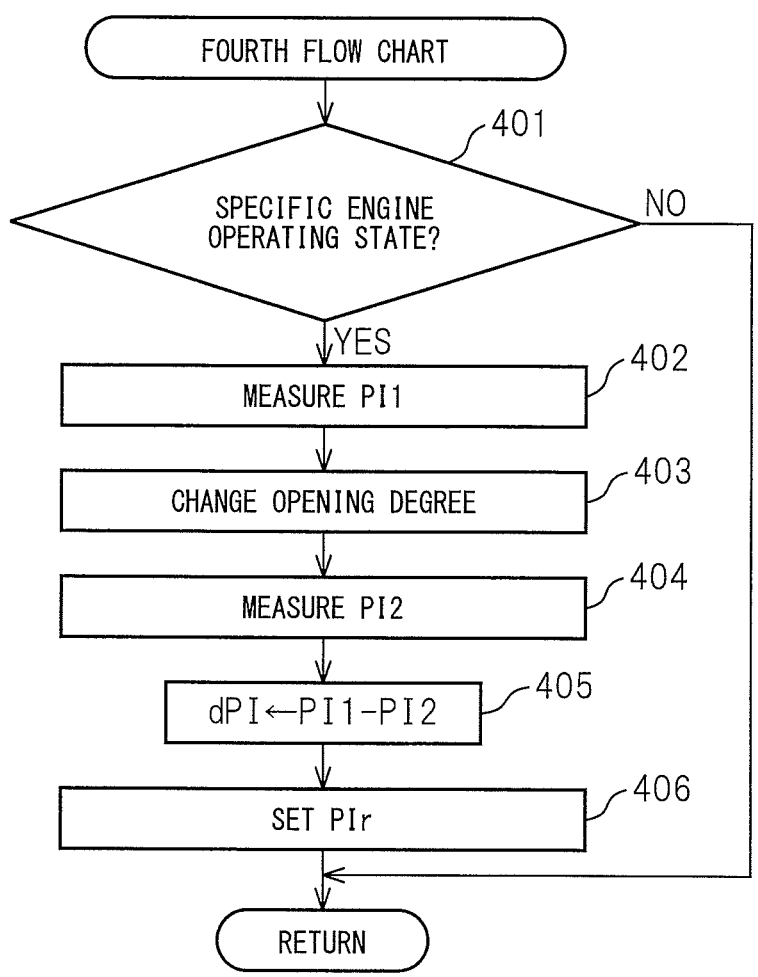
FIG. 17 is a fourth flow chart for setting a supercharging pressure true value.

As shown in FIG. 14, when the exhaust duct 95 of an internal combustion engine which is provided with a variable compression ratio mechanism is provided with a wastegate passage 97 which bypasses the turbine 96 of the turbocharger, the fourth flow chart which is shown in FIG. 17 can be used to set the supercharging pressure true value PIr.

First, at step 401, in the same way as step 301 of the third flow chart, it is judged if the engine is in a specific engine operating state. If this judgment is no, the routine is ended as it is, but when the judgment of step 401 is yes, at step 402, the first supercharging pressure PI1 of the turbocharger when making the opening degree of the wastegate valve 98 the desired opening degree at the specific engine operating state, defined as the first opening degree TA1 (for example, the fully closed opening degree), is measured.

Next, at step 403, the opening degree of the wastegate valve 98 is made a second opening degree TA2 larger than the first opening degree TA1 (for example, a half opening degree), then, at step 404, the second supercharging pressure PI2 of the turbocharger when making the opening degree of the wastegate valve 98 the second opening degree TA2 at the specific engine operating state is measured. Next, at step 405, the difference dPI between the first supercharging pressure PI1 and the second supercharging pressure PI2 is calculated.

At this difference dPI, even if the measurement value PI1 of the supercharging pressure of the first opening degree TA1 of the wastegate valve 98 includes the amount of deviation due to individual differences of the turbocharger, since the measurement value PI2 of the supercharging pressure of the second opening degree TA2 of the wastegate valve 98 includes the same amount of deviation, the amount of deviation due to individual differences is cancelled out. In this way, at step 406, the supercharging pressure true value PIr is set based on the difference dPI.

Figure 18:
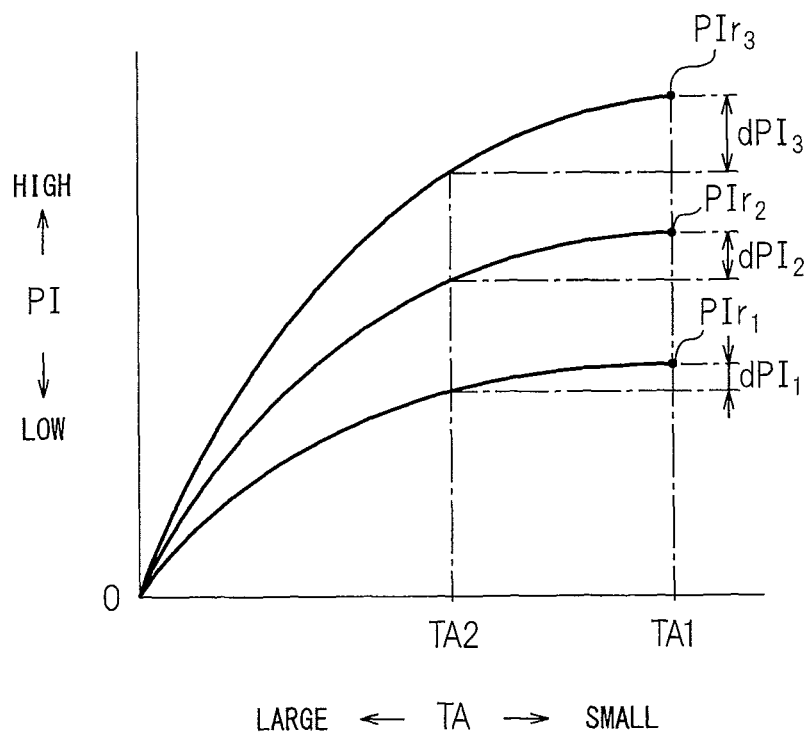
FIG. 18 is a graph which shows a relationship between an opening degree of a wastegate valve and a supercharging pressure.

The larger the opening degree TA of the wastegate valve 98, the greater the amount of exhaust gas which passes through the wastegate passage 97 and does not pass through the turbine 96 of the turbocharger and the lower the supercharging pressure. FIG. 18 shows the changes in the design supercharging pressure with respect to the opening degree of the wastegate valve 98 in a specific engine operating state. The plurality of solid lines are differences in the expansion ratio. As shown in FIG. 18, the higher the supercharging pressure PI when the wastegate valve 98 is the first opening degree TA1 in a specific engine operating state, the larger the fall in the supercharging pressure when making the wastegate valve 98 the second opening degree TA2, that is, the above-mentioned difference dPI.

In this way, it is possible to unambiguously set in advance the supercharging pressure true value PIr for when the wastegate valve 98 is the first opening degree TA1 for the difference dPI. That is, as illustrated in FIG. 18, the supercharging pressure true value PIr when the difference dPI is $dPI_1$ (supercharging pressure not including amount of deviation due to individual differences when the wastegate valve 98 is made the first opening degree TA1 in a specific engine operating state) becomes $PIr_1$, the supercharging pressure true value PIr when the difference dPI is $dPI_2$ becomes $PIr_2$, and the supercharging pressure true value PIr when the difference dPI is $dPI_3$ becomes $PIr_3$. In this way, it is possible to set in advance the corresponding supercharging pressure true value for other values of the difference dPI. In this way, at step 406, it is possible to use the difference dPI as the basis to set the supercharging pressure true value PIr.

The second opening degree TA2 of the wastegate valve 98 was made an opening degree larger than the first opening degree TA1, but unless the desired first opening degree TA1 of the wastegate valve 98 at the specific engine operating state is the fully closed opening degree, the second opening degree TA2 may be made smaller than the first opening degree TA1.

If, like in the first, second, and third flow charts, the accurate mechanical compression ratio Er at the time of a specific engine operating state is estimated, by estimating the actual compression ratio at the time of a specific engine operating state, it is possible to use the estimated mechanical compression ratio and the actual compression ratio as the basis to estimate the accurate closing timing of the intake valve at the time of the specific engine operating state and possible to calculate the correction amount of the closing timing of the intake valve which is detected by the valve timing sensor 23. It is possible to use any method to estimate the actual compression ratio of a specific engine operating state and for example estimate the actual compression ratio based on the fact that the higher the fuel pressure or the easier knocking is to occur, the higher the actual compression ratio becomes.

REFERENCE SIGNS LIST 28 temperature sensor
29 pressure sensor
90 compressor of turbocharger
92 supercharging pressure sensor
96 turbine of turbocharger
97 wastegate passage
98 wastegate valve
A variable compression ratio mechanism
B variable valve timing mechanism

The invention claimed is:

1. An internal combustion engine provided with a variable compression ratio mechanism and a plurality of sensors, the internal combustion engine including an electronic control unit (ECU) having a computer, memory, and input and output ports for receiving signals from the plurality of sensors, the ECU configured to:
   measure a physical quantity which changes in accordance with at least one of the exhaust temperature and the exhaust pressure,
   use a measured measurement value as the basis to estimate a current mechanical compression ratio, and
   wherein the measurement value is a supercharging pressure at a downstream side of a compressor of a turbocharger.

2. The internal combustion engine provided with a variable compression ratio mechanism according to claim 1, the sensor configured to directly or indirectly detect an actuating amount of an actuator of the variable compression ratio mechanism, the actuator is controlled by the ECU so that the actuating amount which is detected by the sensor becomes the actuating amount which corresponds to a target mechanical compression ratio, and the actuating amount which is detected by the sensor is corrected by a difference between the actuating amount which corresponds to a mechanical compression ratio which is estimated based on the measurement value in a specific engine operating state and the actuating amount which corresponds to a target mechanical compression ratio of the specific engine operating state.

3. The internal combustion engine provided with a variable compression ratio mechanism according to claim 2, wherein the specific engine operating state is an engine operating state in which the target mechanical compression ratio becomes a set mechanical compression ratio or less.

4. The internal combustion engine provided with a variable able compression ratio mechanism according to claim 1, wherein when a compressor of a supercharger is arranged at an upstream side of the compressor of the turbocharger, a supercharging pressure is made a differential pressure before and after the compressor of the turbocharger.

5. The internal combustion engine provided with a variable compression ratio mechanism according to claim 1, wherein the ECU estimates a current actual compression ratio and uses an estimated current actual compression ratio and an estimated current mechanical compression ratio as the basis to estimate a current closing timing of an intake valve.

6. An internal combustion engine provided with a variable compression ratio mechanism and a plurality of sensors, the internal combustion engine including an electronic control unit (ECU) having a computer, memory, and input and output ports for receiving signals from the plurality of sensors, the ECU configured to:

measure a physical quantity which changes in accordance with at least one of the exhaust temperature and the exhaust pressure, use a measured measurement value as the basis to estimate a current mechanical compression ratio, wherein a wastegate passage which bypasses a turbine of a turbocharger is provided, a wastegate valve which controls an amount of exhaust which passes through the wastegate passage is arranged in the wastegate passage, and a difference between a supercharging pressure at a downstream side of a compressor of the turbocharger which is measured by the ECU when making the wastegate valve a first opening degree and the supercharging pressure at the downstream side of the compressor of the turbocharger which is measured by the ECU when making the wastegate valve a second opening degree is made the measurement value.

7. The internal combustion engine provided with a variable compression ratio mechanism according to claim 6, wherein when a compressor of a supercharger is arranged at an upstream side of the compressor of the turbocharger, the supercharging pressure is made a differential pressure before and after the compressor of the turbocharger.

* * * * *